United States Patent
Fournet et al.

(10) Patent No.: US 7,437,718 B2
(45) Date of Patent: Oct. 14, 2008

(54) REVIEWING THE SECURITY OF TRUSTED SOFTWARE COMPONENTS

(75) Inventors: Cedric Fournet, Cambridge (GB); Andrew Donald Gordon, Cambridge (GB); Tomasz Pierre Blanc, Paris (FR)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/656,654

(22) Filed: Sep. 5, 2003

(65) Prior Publication Data

US 2005/0055565 A1   Mar. 10, 2005

(51) Int. Cl.
*G06F 9/44* (2006.01)
*G06F 17/00* (2006.01)

(52) U.S. Cl. .......................................... 717/133; 726/1
(58) Field of Classification Search .................... 726/25, 726/1; 717/126, 157, 133–135
See application file for complete search history.

(56) References Cited

U.S. PATENT DOCUMENTS

| | | | | |
|---|---|---|---|---|
| 6,134,662 A * | 10/2000 | Levy et al. | ...................... | 726/11 |
| 6,158,045 A * | 12/2000 | You | ........................... | 717/124 |
| 6,918,126 B1 * | 7/2005 | Blais | .......................... | 719/332 |
| 6,973,460 B1 * | 12/2005 | Mitra | ...................... | 707/103 R |
| 7,032,212 B2 * | 4/2006 | Amir et al. | ................... | 717/124 |
| 7,051,322 B2 * | 5/2006 | Rioux | ........................ | 717/143 |
| 7,076,803 B2 * | 7/2006 | Bruton et al. | ................. | 726/23 |
| 7,076,804 B2 * | 7/2006 | Kershenbaum et al. | ....... | 726/30 |
| 7,089,530 B1 * | 8/2006 | Dardinski et al. | ........... | 717/105 |
| 7,089,581 B1 * | 8/2006 | Nagai et al. | ..................... | 726/1 |
| 7,096,498 B2 * | 8/2006 | Judge | .......................... | 726/22 |
| 7,162,741 B2 * | 1/2007 | Eskin et al. | .................... | 726/25 |
| 2003/0018909 A1 * | 1/2003 | Cuomo et al. | ................ | 713/200 |
| 2004/0255277 A1 * | 12/2004 | Berg et al. | .................. | 717/124 |
| 2004/0260940 A1 * | 12/2004 | Berg et al. | .................. | 713/200 |
| 2005/0010806 A1 * | 1/2005 | Berg et al. | .................. | 713/200 |

OTHER PUBLICATIONS

Naumovich, Gleb; "A Conservative Algorithm for Computing the Flow of Permissions in Java Programs", 2002 AMC, retrieved Feb. 6, 2007.*
Phillips, Cynthia; Swiler, Laura Painton; "A Graph-Based System for Network-Vulnerability Analysis", p. 71-79, 1998 ACM, retrieved Feb. 6, 2007.*
Weber, Michael; Shah, Viren; Ren, Chris; "A Case Study in Detecting Software Security Vulnerabilities using Constraint Optimization", 2001 IEEE, retrieved Feb. 6, 2007.*
Xie, Yichen; Chou, Andy; Engler, Dawson; "Archer: Using Symbolic, Path sensitive Analysis to Detect Memory Access Errors", 2003 ACM, retrieved Feb. 6, 2007.*
Edwards et al. "Runtime Verification of Authorization Hook Placement for the Linux Security Modules Framework", Nov. 2002, ACM, pp. 225-234.*
Jaeger et al. "Policy Management Using Access", Aug. 2003, ACM TISSEC vol. 6, Issue 3, pp. 327-364.*

* cited by examiner

*Primary Examiner*—Wei Y. Zhen
*Assistant Examiner*—Anna Deng

(57) ABSTRACT

An analysis tool provides a call path set for reviewing the security of trusted software components during development. By examining the usage of permissions in programs and libraries within a managed execution environment, potential gaps in the security of trusted components may be identified. A call graph generator creates a permission-sensitive call graph. A call graph analyzer evaluates the permission-sensitive call graph to highlight call paths that may present security risks.

73 Claims, 4 Drawing Sheets

REVIEWING THE SECURITY OF TRUSTED SOFTWARE COMPONENTS

TECHNICAL FIELD

The invention relates generally to execution environments, and a security model in an execution environment.

BACKGROUND

It is a common scenario in networked computer systems for untrusted (or only partially trusted) program code to be received over the network (e.g., the Internet) and executed on a user's computer. Such untrusted code may include without limitation application updates, applets, plug-ins, user macros in documents, command-line scripts, programs downloaded from the network, etc. For example, a user may download a stock ticker applet written in a platform-independent intermediate language to be executed within a managed execution environment on the user's computer.

However, because the origin of the downloaded applet is unknown or untrusted, the user may not be confident in the safety of executing the applet on his or her computer, and rightly so—the applet code may include malicious instructions intended to steal or destroy the user's data. Alternatively, while the code may not be malicious, improperly implemented code may inadvertently access or destroy the user's data. Accordingly, such managed execution environments commonly embed a security framework to protect the user's system.

Such security frameworks typically include a layered permission-based infrastructure. Varying permissions are attributed to each piece of code to be executed within the managed execution environment. Only code having the necessary permissions are allowed to execute various operations (e.g., an operation that accesses a system resource).

Also, as part of the layered aspect of the security framework, untrusted code is isolated from sensitive system functions by more trusted components. In one circumstance, an exemplary untrusted applet cannot directly access the file system to modify a file. Instead, to modify a file in the file system, the untrusted applet must call a trusted component (e.g., an object in a file system library provided by the operating system vendor), which can access the file system.

However, the trusted component is also designed to adhere strictly to the constraints of the security framework. Therefore, unless the untrusted applet is attributed with adequate permissions to access the file system, and specifically to modify the file, the trusted component should deny the requested access. Moreover, the permissions required to access the file system may vary depending on the type of access requested. For example, weak permissions may be required to access a cookie file in a directory of cookies, while strong permissions may be required to delete private user data elsewhere in the file system.

A significant strength of this security framework lies within the strict adherence of the trusted components to the constraints of the security framework. However, for a variety of reasons, even the security of highly trusted components may be compromised in the presence of arbitrary untrusted code or improperly implemented trusted code (e.g., when the highly trusted code does not actually adhere strictly to the constraints of the security framework).

SUMMARY

Implementations described and claimed herein address the foregoing problems by providing an analysis tool for reviewing the security of trusted software components during development. By examining the usage of permissions in programs and libraries within the managed execution environment, potential vulnerabilities in the security of trusted components may be identified. In a first stage, a call graph generator creates a permission-sensitive call graph. In a second stage, a call graph analyzer evaluates the permission-sensitive call graph to highlight call paths that may present security risks. A developer can evaluate a call paths set that includes some or all of the highlighted call paths to investigate possible security vulnerabilities.

In some implementations, articles of manufacture are provided as computer program products. One implementation of a computer program product provides a computer program storage medium readable by a computer system and encoding a computer program that generates a call graph. Another implementation of a computer program product may be provided in a computer data signal embodied in a carrier wave by a computing system and encoding the computer program that generates a call graph.

The computer program product encodes a computer program for executing on a computer system a computer process for generating a call graph. Input component code and a runtime security policy are received into an execution environment. A call graph is generated that includes call paths through the input component code simulated in combination with at least one symbolic component representing additional arbitrary code that complies with the runtime security policy.

In another implementation, a method is provided. Input component code and a runtime security policy are received into an execution environment. A call graph is generated that includes call paths through the input component code simulated in combination with at least one symbolic component representing additional arbitrary code that complies with the runtime security policy.

In yet another implementation, a system is provided. A call graph generator receives into an execution environment input component code and a runtime security policy. The call graph generator generates a call graph of call paths through the input component code simulated in combination with at least one symbolic component representing additional arbitrary code that complies with the runtime security policy.

Another implementation of a computer program product provides a computer program storage medium readable by a computer system and encoding a computer program that analyzes a call graph. Another implementation of a computer program product may be provided in a computer data signal embodied in a carrier wave by a computing system and encoding the computer program that analyzes a call graph.

The computer program product encodes a computer program for executing on a computer system a computer process for analyzing a call graph. A call graph that includes call paths through input component code is analyzed. The call paths are simulated in combination with at least one symbolic component that represents additional arbitrary code that complies with a runtime security policy. A subset of the call paths in the call graph that satisfy the query is identified.

In another implementation, a method is provided that includes analyzing a call graph that includes call paths through input component code. The call paths are simulated in combination with at least one symbolic component that represents additional arbitrary code that complies with a runtime security policy. A subset of the call paths in the call graph that satisfy the query is identified.

In another implementation, a system includes a call graph analyzer that analyzes a call graph of call paths through input component code simulated in combination with at least one symbolic component that represents additional arbitrary code that complies with a runtime security policy. The analyzer analyzes the call graph relative to at least one query and identifies a subset of the call paths in the call graph that satisfy the query.

Other implementations are also described and recited herein.

BRIEF DESCRIPTIONS OF THE DRAWINGS

DETAILED DESCRIPTION

Figure 1:
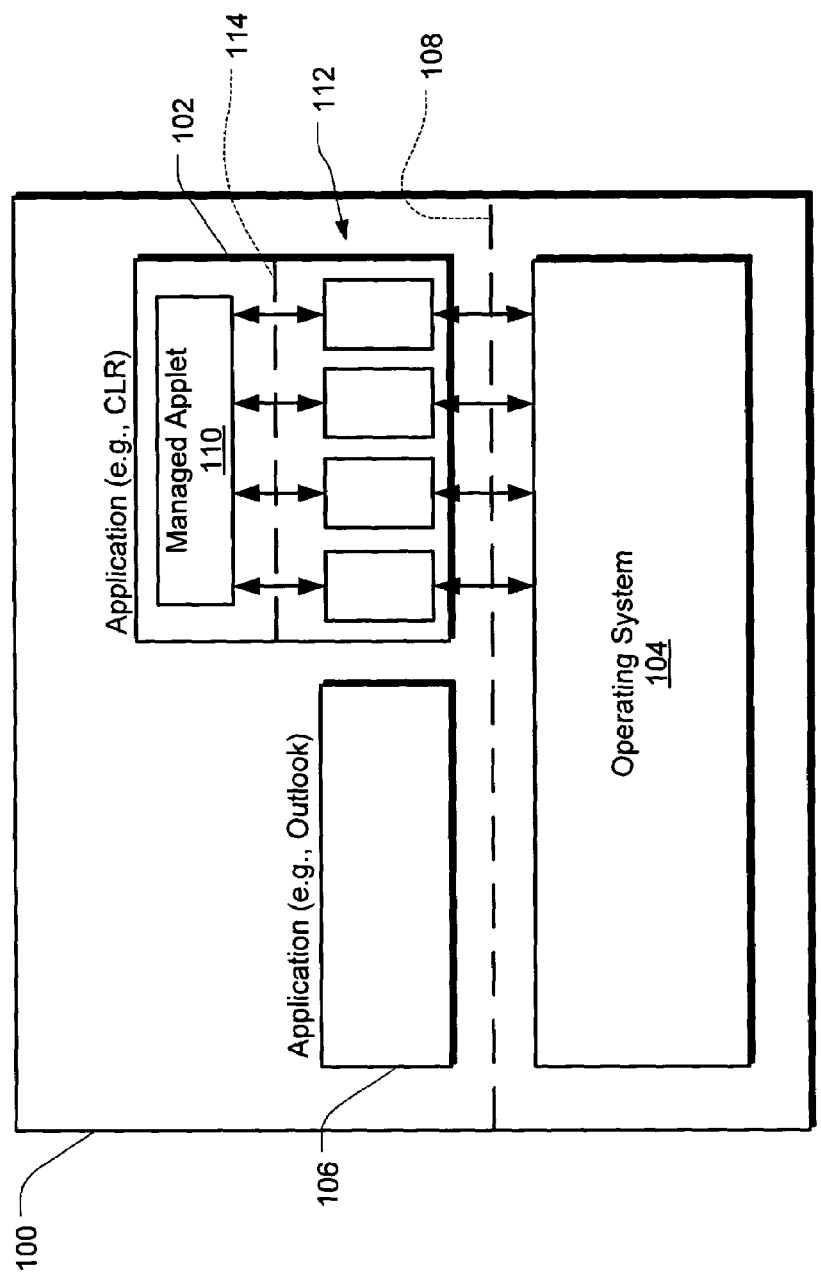
FIG. 1 illustrates an exemplary managed execution environment.

A feature of a managed execution environment described herein is that it facilitates the deployment and integration of software components. For example, the same component code may be used on different kinds of systems, one running Windows and another running a variety of UNIX. Units of code deployment are called "assemblies" and include portable code and metadata describing the code's intended usage and requirements. As pertains to security, the metadata, such as a digital signature, may provide evidence of origin. At runtime, various assemblies may also share the system resources, such as the same memory, the same stack, the same namespace, and the same libraries.

Some operations of a program in a managed execution environment are both useful and dangerous (e.g., send an email, delete a file, perform a system call, etc.). Understandably, such operations should be enabled for some code, but not all code. Therefore, an exemplary security framework keeps track of "code identity", i.e., the identity of the code that is responsible, either directly or indirectly, for requesting the execution of the operation. Permissions are attached to the identified code so that the operations that are available to the code are limited by these permissions (i.e., limited to those operations allowed by the permissions).

In one implementation, two complementary mechanisms are enforced:

(1) The rights attached to every piece of code are made explicitly (e.g., according to the origin of the code and evidence attached to the code). This assignment of rights to code and various security checks performed as the code is loaded are referred to as the "runtime security policy".

(2) Before any security sensitive operation is executed, the rights of any pieces of code responsible for the operation are examined. This examination is referred to as "permission and stack inspection".

An exemplary stack inspection measure can determine the runtime rights of each piece of code as a function of the call stack. Rights for a given piece of code may be represented by static permissions attributed to the piece of code in accordance with the code's level of trust. Then, before accessing a sensitive resource, the call stack is inspected to verify that every caller in the call stack has been granted the necessary rights.

Stack inspection is a strong security measure, but it presents complications for programmers who are trying to verify that their code is secure. The behavior of this code and, therefore, its security are strongly dependent upon the local security framework and the runtime stack. In one implementation, an analysis tool checks the use of permissions in trusted component code (e.g., trusted library code) in an open system, where only some of the program code in the managed execution environment is available at analysis-time. Based on this permission check, potentially non-secure call paths are identified to allow the developer to evaluate these possible security gaps. Some of the identified call paths may be determined by the developer not to present a real security risk, while other identified call paths may represent actual security problems with the trusted code. Non-secure paths may be corrected by the developer when identified.

FIG. 1 illustrates a system 100 executing an exemplary managed execution environment 102 as an application (e.g., a Common Language Runtime or CLR application). An operating system 104 executes within the system 100 to manage system resources and basic system functionality. The operating system 104 provides coarse access control to the system resources using security tokens and access control lists (ACLs). Applications 106 and 102 access the operating system 104 through controlled interface 108 (e.g., the Win32-x86 interface).

The application 106 is an example of typical application that is installed on a user's computer by the user or an administrator. The application 106 may be executed directly from the operating system 104 and generally has access to system resources directly through the operating system 104.

The application 102 is an example of a special application that manages execution of portable programs written in any of several supported languages, allowing them to share common object-oriented classes written in any of the supported languages as well as available system resources (e.g., CPU, network, files, etc.). These portable programs may have diverse and even unknown origins and they may include application updates, applets, plug-ins, user macros in documents, command-line scripts, programs downloaded from the network, etc. Portable programs generally present a higher-level of security risk than the application 106. Therefore, the application 102 manages the execution of such portable programs and performs fine-grained access control using features such as types, permissions, stack inspections, etc. to protect the system resources. Furthermore, these programs may share system resources, but they may do so with varying levels of trust. Therefore, some portable programs may have more access than others within the security framework of the managed execution environment 102.

A managed applet 110 is shown as an example of a portable program that executes within the managed execution environment. The application 102 executes the applet 110 and manages its access to system resources in accordance with the applet's permissions and the existing security framework. The applet's level of trust is represented by the static permissions that are attributed to it.

One aspect of the security framework involves a set of one or more trusted components 112 executing within the managed execution environment. The trusted components 112 may be provided or certified by the operating system vendor, the managed execution environment vendor, or some other trusted vendor. The trusted components 112 generally have a higher level of trust than the applet 110. The higher level of trust enjoyed by these trusted components 112 allows them to have more static permissions and a greater level of access to the system resources. As such, the applet 110 typically accesses the trusted components 112 through a controlled interface 114 and accesses the system resources indirectly through the trusted components 112. It should be understood that there may be many levels of components, all of potentially varying levels of trust, executing within the managed execution environment and executing in cooperation with the applet 110.

The trusted component code typically includes security demands to the security framework, which determines whether a piece of sensitive code may be executed based on the dynamic permissions available at the demand point at runtime. If the demand is not satisfied, an exception is thrown and the sensitive code is not executed.

However, security gaps in the trusted components 112 can severely compromise the security of the entire system 100. Therefore, it is important that security gaps in trusted components are located and corrected before the trusted components are deployed. Therefore, the security of the trusted components 112 in FIG. 1 has been reviewed by their developers prior to their deployment into the managed execution environment 102.

In the illustrated implementation, a set of test permissions was specified (e.g., by a developer) to characterize the level of trust attributed to an arbitrary untrusted program. Based upon this characterized level of trust, an analysis tool generated a call graph associated with the trusted components 112 to assist the developer in identifying potentially non-secure code points within the trusted components.

In another implementation, a developer has also applied one or more queries to the call graph to filter out call paths that are ostensibly unrelated to a specific security concern. For example, a developer can apply a query pertaining to the ability to execute a FILE.DELETE method in one of the trusted components. The analysis tool evaluates the query against the call graph, the test permissions, and the security framework to identify a subset of call paths that may be executed by an arbitrary unknown applet, which is characterized by the specified test permissions, to satisfy the query. The developer can then evaluate this identified subset of the call paths in the call graph to determine whether a security concern exists. By generating this subset of call paths, the analysis tool greatly decreases the effort required to identify non-secure methods and, therefore, improves the overall security of the trusted components 112 executing in a managed execution environment. In addition, the tool may also generate its own queries and check the results automatically, flagging potentially unsafe code.

Access rights are represented in a managed execution environment using runtime permissions, which include a collection of objects organized by classes. Each such permission class details the rights to access specific resources. For example, class UIPermission describes access to the user interface and has a Boolean flag that controls access to the clipboard, and class FileIOPermission describes read and write access to the file system, potentially for every possible file path.

When a code assembly is loaded into the managed execution environment, its access rights are determined by the runtime security policy, and the corresponding static permissions are associated with every piece of code from that assembly. These static permissions give an upper bound to the permissions that the code can actually use. An exemplary default security policy may be to grant most permissions to code written by the user, and restricted permissions to downloaded code.

When examining access rights at runtime, before executing a sensitive operation, the current dynamic permissions are compared to the permissions requested for the operation. If the dynamic permissions do not include the requested permission, a security exception is thrown. Otherwise, the operation proceeds. As a first approximation, the dynamic permissions are computed as the intersection of the static permissions for all methods on the current call stack. As a refinement, any method may assert additional dynamic permissions for the benefit of its callees, provided they are already included in the calling method's static permissions Dynamic permissions are not explicitly maintained by the managed execution environment. Instead, they are extracted from the stack on-demand, whenever a security check is performed. This exemplary approach, referred to as "stack inspection", proceeds as follows:

A security check requests a check for a requested permission (e.g., permission to write to a given file). For each frame on the stack, starting from the most recent frame, the code pointer in the frame is used to retrieve the static permissions for that code. If a requested permission is not included in these static permissions, then the inspection fails and a security exception is thrown. Otherwise, if the frame being considered explicitly grants the requested permission, the inspection immediately succeeds. Otherwise, the next frame is considered.

In addition, some access rights may be examined at load-time. When loading the code of a component that calls a method with a "link-demand" request, the managed execution environment checks that the requested permission is included in the static permissions of the caller. Otherwise, the link-demand fails and a security exception is thrown.

In this context, a permission-sensitive call graph may be generated by simulating the mechanics of the trusted component code within the context of a given security framework. Thereafter, the resulting call graph may be analyzed relative to a specific set of queries to identify possible security gaps.

Figure 2:
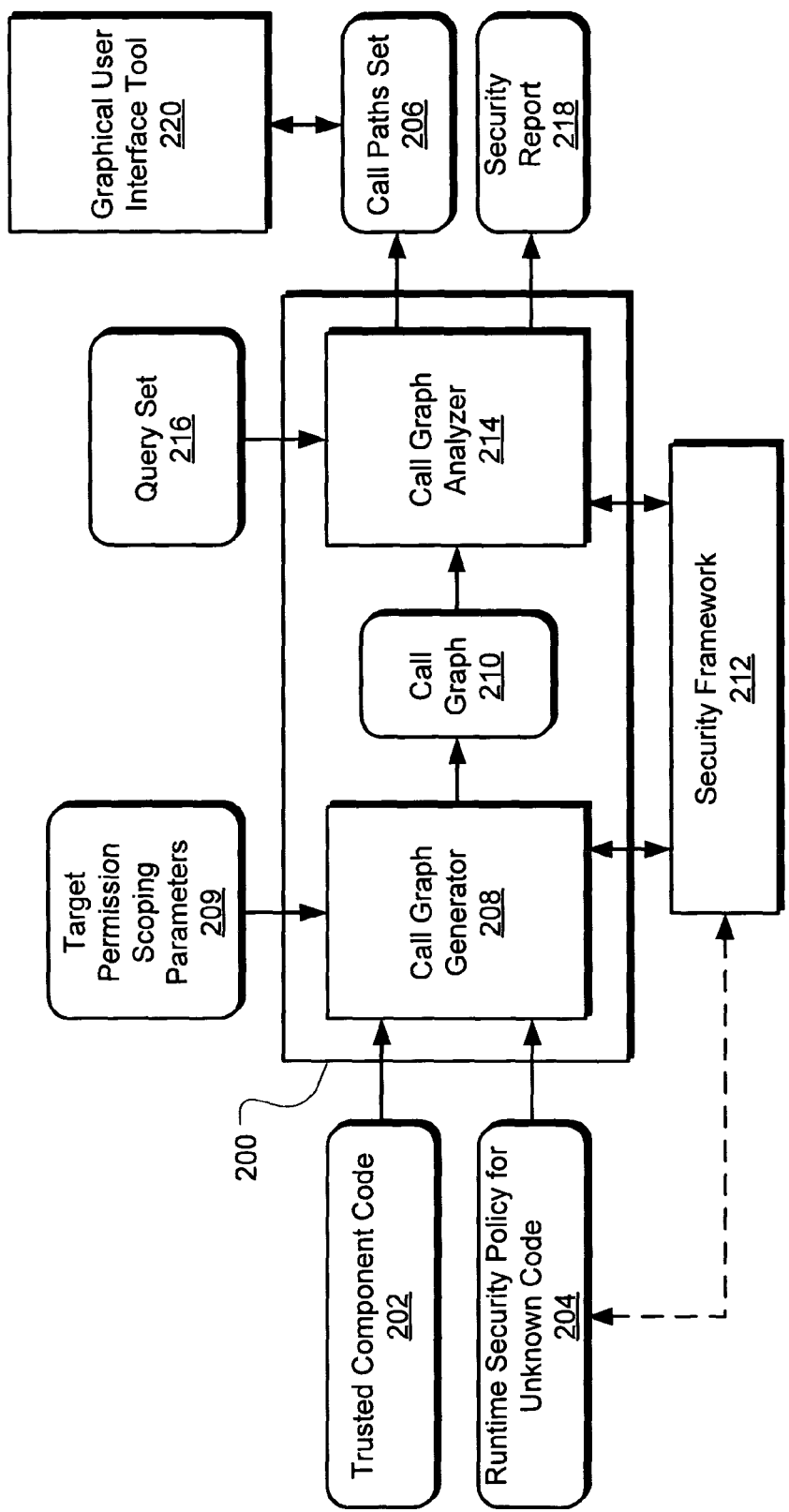
FIG. 2 illustrates an exemplary analysis tool for execution in a managed execution environment.

FIG. 2 illustrates an exemplary analysis tool 200 for reviewing trusted component code for execution in a test configuration of a managed execution environment. In a typical scenario, a trusted component developer or tester provides trusted component code 202 and a runtime security policy for unknown code 204 as inputs to the tool 200. The trusted component code 202 includes the program code and data for one or more trusted components that the developer wishes to test within the security framework.

The runtime security policy 204 represents a hypothesis of the static permissions attributed to an unknown program (e.g., an applet) that may be executed within the test configuration using the provided trusted component code 202. Using this runtime security policy 204 and the analysis tool 200, the developer can review the trusted component code 202 for security gaps using a resulting call paths set 206. Alternatively, the runtime security policy 204 is obtained from the security framework 212 for input to the analysis tool.

In order to abstractly represent sets of permissions in one implementation, both in the input stage and during analysis, a symbolic representation for permissions is employed in combination with an associated symbolic implementation of the operations on permissions, such as Assert and Demand. The choice and precision of the symbolic representations can be controlled by the target permission scoping parameters 209 that may be input to the analysis. The target permission scoping parameters 209 specifies the subset of permissions that the developer or tester wishes to analyze. By specifying this subset, performance of the call graph generation and analysis may be improved.

It should also be understood that, if performance allows, a non-symbolic representation of permissions may be employed. For example, a permission set may be represented non-symbolically using a machine word if the number of permissions is no more than the width of the word.

In various implementations, therefore, the permissions may be represented in a variety of ways (as controlled by the target permissions scoping parameters 209) including without limitation:

(1) Permissions may be represented symbolically by two values: NO_PERMISSIONS (representing any sets of permissions that are statically granted to unknown code) and SOME_PERMISSIONS (representing any sets of permissions).

(2) Permissions may be represented symbolically by an array of the two values, NO_PERMISSIONS and SOME_PERMISSIONS, indexed by a fixed collection of permission classes, thereby representing permissions for each of these classes independently.

(3) Permissions may be represented explicitly in the same representation used in the security framework.

(4) Some permissions may be represented symbolically while some permissions may be represented explicitly. This allows permission analysis when certain parameters of the permissions (e.g., the exact file name used in a specific permission to delete that file) cannot be determined during the analysis.

(5) Permissions may be represented differently for each usage of permissions in the analysis. For example, a more precise symbolic representation may be represented in the second stage of analysis than in the first stage of analysis.

For a given choice of symbolic representation, corresponding symbolic operations are defined in order to approximate (i.e., typically a conservative approximation) the operations in the system. For example, when permissions are represented by the two values identified in item (1) above, an operation of adding a permission to "NO_PERMISSIONS (a) yields NO_PERMISSIONS, if the permission is statically granted to unknown code, and (b) yields SOME_PERMISSIONS otherwise. Likewise, performing a Demand of a permission not included in the static permissions granted to unknown code always fails on NO_PERMISSIONS and may or may not succeed on SOME_PERMISSIONS.

In order to extract the symbolic representation of the permissions that are used in an input of the analysis, and in particular, in the security policy and actions of the known code, an auxiliary analysis may be employed. For example, a security Demand in a piece of code usually takes as a parameter a permission that is locally constructed or that is stored in a private field. Therefore, detailed information on that permission may be obtained by a local-data-flow analysis. Note that the auxiliary analysis may return a symbolic representation that approximates the resulting permissions in complex cases.

The trusted component code 202 and the runtime security policy 204 are received by a call graph generator 208, which generates a permission-sensitive call graph. Let a "node" be represented by a pair(M,D), where D is a symbolic permission set and M is either (a) a known method implementation in a trusted component or (b) a token representing an unknown method implementation belonging to some unknown component, representing arbitrary untrusted or partially trusted code. The permission-sensitive call graph consists of a set of nodes and a set of directed, labeled edges. Each edge extends from one node (the symbolic caller) to another (the symbolic target). The label of an edge includes (1) a call-site within the method implementation of the node and (2) a sequence of security actions preceding the call-site within the method implementation. These actions represent operations on permissions within the method, including Demands and Asserts with their symbolic permission parameters.

Accordingly, a given piece of code that can be executed within different dynamic security contexts may be represented as several nodes in the call graph, each with a different symbolic set of dynamic permission and potentially different outgoing edges.

The call graph generator 208 takes into account the particular semantics of the underlying runtime security framework 212, including without limitation the object model, the type system, the access modifiers, the resolution of virtual calls, and the inheritance hierarchy. In this context, the call graph generator 208 analyzes the trusted component code 202 and the runtime security policy 204, as they would apply to unknown, arbitrary code, to generate the call graph 210.

The resulting call graph 210 is stored in a computer-readable storage medium (e.g., memory or a hard disk) and then input to a call graph analyzer 214. In addition, one or more queries in a query set 216 are input to a call graph analyzer 214. Some queries maybe automatically or previously generated and then checked by the call graph analyzer 214. Security gaps identified by the automatic checking are output as security reports 218 on possible security vulnerabilities or as identified call paths in a call paths set 206. Other queries may be manually generated by the developer or tester. The call graph analyzer 214 outputs the call path set 206, which includes a subset of call paths that satisfy the queries. Some queries can also involve auxiliary analysis of the code and any information provided by the call path set 206, which is accessible through a graphical user interface tool 220.

Figure 3:
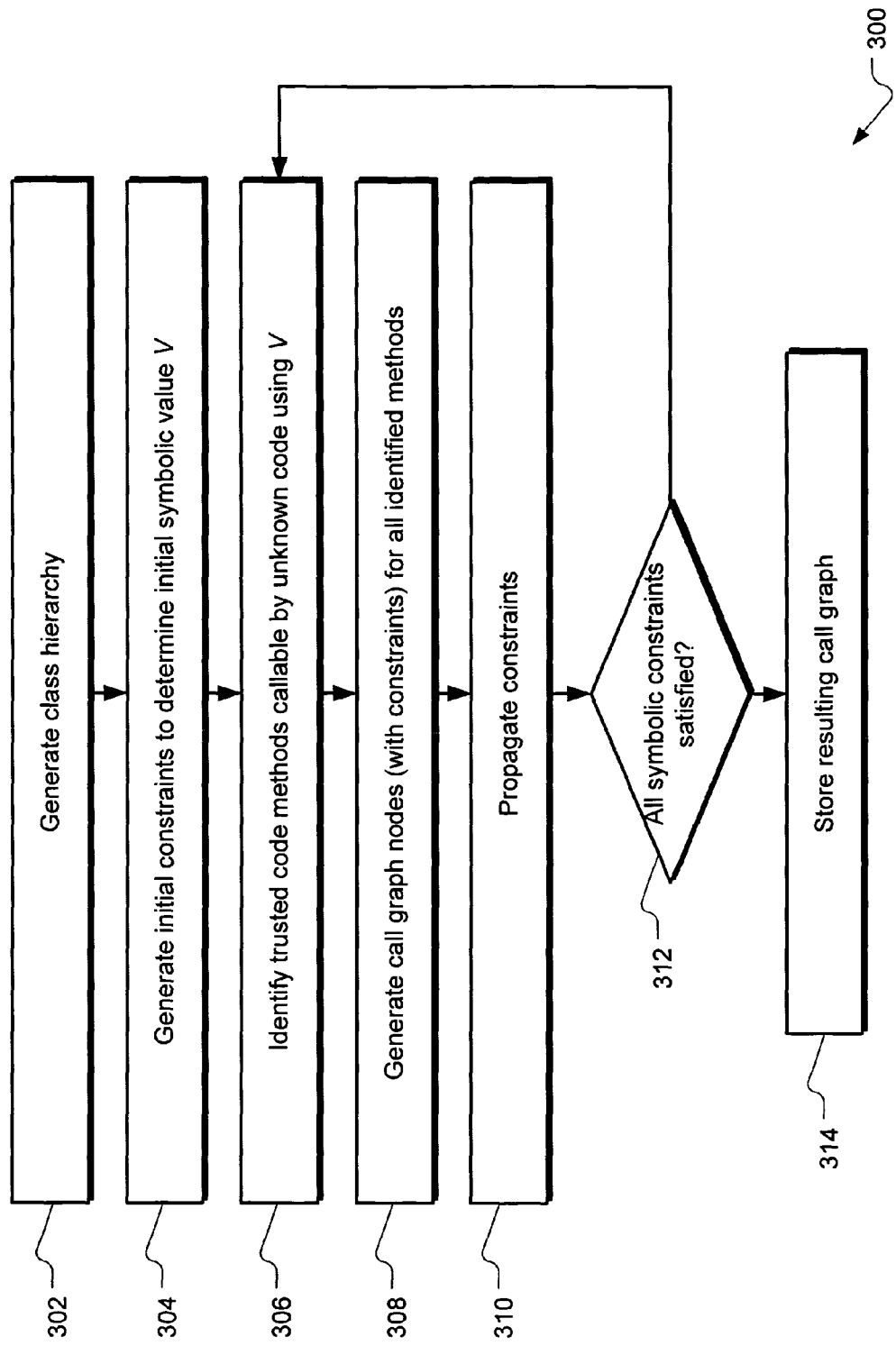
FIG. 3 illustrates exemplary operations for generating a permission-sensitive call graph.

FIG. 3 illustrates exemplary operations 300 for generating a permission-sensitive call graph. For a given input configuration, a call graph is deemed "correct" when, (a) for any configuration extended with additional component code that is accepted by the runtime security policy characterizing the unknown code and (b) for every runtime call from one piece of code to another, there is (1) a corresponding edge between two nodes associated with those two pieces of code and (2) the runtime dynamic permissions for these pieces of code correspond to the symbolic dynamic permissions for their nodes.

A hierarchy operation 302 receives the trusted component code and generates a class hierarchy that contains the classes of the trusted components plus symbolic classes that represent any class that may be defined in unknown components. For each class in an unknown component that can be added to the system according to the security policy, there exists a corresponding symbolic class in the completed class hierarchy. Hence, a single symbolic class in the analysis can represent many possible classes in unknown component.

In one implementation, the completed class hierarchy may be generated by simulating the mechanisms of the system, including its type discipline and its security policy, and may depend in particular on the class definitions in the trusted components and on the runtime security policy characterizing the unknown code. This simulation may also depend upon rules of class and interface inheritance, access modifiers (e.g., public, private, virtual, sealed, etc.), and on specific declarative security attributes (e.g., parametric InheritDemands).

In languages with virtual calls, the generation of the call graph may also involve the symbolic representation of runtime values. For example, runtime values may be represented as sets of dynamic classes in the completed class hierarchy.

A generation operation 304 generates initial constraints to determine an initial value of a symbolic value V, which represents all values that may be obtained by any unknown code at runtime (e.g., as the result of calls to known method implementations, as the parameters of callbacks from known to unknown code, through shared data structures, etc.). The symbolic value V can be updated during the analysis as new dataflow to unknown code is revealed.

An identification operation 306 uses V to identify trusted code methods that are directly callable by unknown code. In one implementation, for example, these identified methods may include public methods of trusted classes, protected methods of trusted classes (if the class is not sealed), and methods in an accessible assembly. In addition, if the unknown code has obtained a value compatible with the instance type, the method may be identified unless the method has a link-demand on a permission that is not included in the static permission of the unknown code.

For each such identified method, a generation operation 308 adds a node with appropriate constraints to the call graph. Constraint generation may identify additional trusted code methods and result in insertion of additional nodes in the call graph and generation of additional constraints. In one implementation, constraint generation relies on the generation of an intra-method control-flow graph, which depends on branching instructions, exception handling, etc. The intra-method control-flow graph propagates information on the (usually empty) series of local security actions that have been performed since the method entry point. To obtain an efficient implementation of the graph construction, tables may be used to cache the result of many computations, such as the symbolic evaluation of actions on permissions, the accessibility checks, and the resolution of method references to method implementations.

In one implementation, the identification of trusted code methods to be included in the call graph is accomplished by generation and resolution of constraints. Generally, constraints simulate the dataflow of symbolic values manipulated by trusted code and may also simulate the dataflow of symbolic values between trusted code and unknown code.

Constraint resolution operation 310 propagates the symbolic values, which may result in insertion of additional nodes in the call graph and generation of additional constraints. When a call to a native method, which is implemented outside the managed execution environment, is performed, and in other circumstances when a call cannot be symbolically traced during analysis, a symbolic representation of any values that have the static return type of the method is assigned to the result of the call. For example, if values are represented as sets of classes, the return variable is assigned the set of all subclasses of the static return class in the completed class hierarchy.

Direct calls to a given method reference R on a given object of type T (either present in the code or generated by solving virtual-call constraints), are solved in one implementation by:
  Computing the method implementation M associated with R and T, according to the method resolution rules of the system;
  Computing the (symbolic representation of the) dynamic permissions D' for that method implementation as the intersection of the dynamic permissions D of the caller for that call site and of the static permissions $S_M$ of the callee;
  Unless a node(M,D') already exists, create this node and recursively generate the constraints for that node;
  Record an edge from the call-site to that node; and
  Generate constraints for each parameter of the call and for its returned result (if any), depending on the type signature of the method reference.

Virtual calls are common cases of inter-method control flow. In one implementation, virtual call constraints are solved as follows:
  For each dynamic class of the input variable associated with the object used for the virtual call,
    If the class is a trusted class, then perform a direct call to the method reference on that class type.
    If the class is a symbolic class representing some unknown code,
      If the symbolic class can inherit a method implementation from a trusted parent class or interface, then perform a direct call to that method implementation, as detailed above; and
      If the symbolic class can provide a method implementation for that signature, then record an edge from the call site to unknown code and, for each parameter and for the returned result (if any), generate a constraint that safely approximates a dataflow with unknown code (i.e., any value passed as a parameter becomes available to unknown code and is added to the symbolic value V; and any (type-safe) value can be returned by the unknown code).

When an instruction triggers a dynamic action on permissions (e.g., by performing a virtual call to the Demand method), a special conditional constraint is generated from the local parameters of the call. This constraint is solved by considering the values that flow to the variable representing the permission used to perform the action. For example, in the case of a Demand P, it can be determined whether the value that flows to P may be included in the dynamic permissions of the node being analyzed. If so, the analysis is resumed on the piece of code guarded by the Demand. Otherwise, the Demand would fail at runtime and the analysis need node consider the code guarded by the Demand.

In the case of an Assert P, the value that flows to P is used to compute an updated set of dynamic permissions D' as the union of D and P intersected with the static permission for that code, S. The analysis is then resumed on the piece of code guarded by the Assert with dynamic permissions D'.

An alternative implementation for Asserts and Demands assumes that a single permission value flows to that variable P and validates that assumption at the end of the analysis. Pragmatically, this assumption is almost always true in trusted libraries, thereby enabling a more precise symbolic simulation of the security action. Independently, the resolution of security actions can advantageously be deferred, so as to generate first a call graph that does not depend on the security policy and can be completed into different call graphs for different security policies.

Actions on permissions that are programmed using declarative security attributes may also be handled as described above.

When an object is created, the symbolic result represents only values with the dynamic class of the object constructor. When the value of an expression is stored into a variable (such as a local variable, an entry on the stack, a parameter of a method, or a method result), a constraint is generated that states that all the symbolic values taken by the expression are included in the symbolic values taken by the variable.

A decision operation 312 determines whether additional propagation is possible, based on whether all symbolic constraints are satisfied. If so, the next iteration is performed starting at the identification operation 306. Otherwise, a storage operation 314 stores the resulting call graph in a computer-readable medium. The resulting call graph is a conservative representation of all potential call paths initiated by the arbitrary unknown code that is represented by the input runtime security policy.

The resulting call graph provides an informative context to assist the developer or tester in reviewing the code for security risks. Some exemplary structural properties of the resulting call graph are highlighted below:

(1) A call graph contains a set of security-sensitive methods that may be reached in the presence of unknown code, as specified by the input runtime security policy of the unknown code.

(2) The source for a given piece of code can be annotated with the static permissions and the (potentially multiple) dynamic permissions for that piece of code in the context of the global security framework used to generate the graph. This information is particularly helpful when these dynamic permissions are strictly lower than the static permissions or when they may take multiple values.

(3) Each call site can be annotated with the actual nodes (e.g. method implementations and associated dynamic permissions) that can effectively be called from that call site at runtime.

(4) When a piece of trusted code can call some unknown code (e.g., as a result of a virtual call), the call site can be annotated with a symbolic description of the unknown callee, such as "any implementation of method M in a subclass of class C". This information is useful to detect the escape of sensitive values passed as parameters to unknown code.

After a call graph is generated, a developer or tester can display the symbolic representations of any values that are accessible to unknown code. In addition, the developer or tester can highlight reachable method implementations that perform sensitive actions that operate on permissions, that may call unknown code, or that can be executed with (symbolically) different sets of dynamic permissions.

In addition, for each sensitive action, the call graph provides a collection of paths that lead from unknown code to that particular action. For example, a system call that deletes a file is a sensitive action and should be reachable from unknown code only in specific circumstances with adequate security checks that can be assessed for all call paths from unknown code to that system call.

In this context, a permission-sensitive control-flow analysis can provide valuable information to a developer or tester of trusted code components to confirm compliance with a security framework.

One aspect of this analysis involve the input of one or more queries (whether manual or automatic) to flag potential security vulnerabilities and to narrow the number of call paths that are included in the resulting call paths set for review by the developer or tester. Queries may be expressed as structural properties on call paths, such as "All paths from unknown code to any sensitive action in a given set" or "All paths with a Demand followed by an Assert for a given permission class". The queries are used to evaluate the call graph to yield a set of paths that can be reported to the developer or tester using an exemplar for each class of paths that satisfies the structural properties by appealing to an adequate definition of equivalence between paths. For example, two paths are equivalent if they contain the same interleaving of security actions, irrespective of intermediate calls, and the exemplar is a path with the least number of intermediate calls. Once a particular path has been identified to satisfy a query, the path in the call graph can be displayed as a symbolic runtime stack representing a series of nested calls interleaved with permission operations.

A call graph analyzer can also perform a wide variety of security checks on trusted code components. Exemplary checks are discussed below.

In one implementation, use of permissions, such as in Demand and Assert instructions, is checked. Each dynamic operation on permissions should have a clear purpose. As such, dynamic operations on permissions that are defined in the call graph and that have an unclear purpose may reveal a security problem in the system. Therefore, using queries for each dynamic permission operation (e.g., Demand or Assert) can check whether the security programming is adequate.

One rule that can be applied is that every permission Demand should be necessary. For each "Demand P" followed by a piece of code, the analysis module checks to determine whether the permission Demand is necessary by:

(1) Verifying that the Demand may fail at runtime, thereby justifying its runtime cost. Such a check may be achieved by identifying a node in the call graph for the method implementation with that demand having dynamic permissions D that do not necessarily include P. If no such node is identified, the Demand may be flagged as redundant in the test configuration, which may warrant removing the Demand from the trusted component code or reviewing the demanded permission P (wherein P is referred to as a parameter permission of the Demand).

(2) Recursively computing the method implementations that are (a) reachable from that protected piece of code and (b) only reached at nodes with dynamic permissions D that include P, irrespective of the caller. These method implementations can be used to document the security need for coding the Demand. In case there is no such method implementation, the Demand can be flagged as potentially erroneous in that test configuration. Similarly, relying on classification of sensitive actions in the code, the call graph can be used to associate with each Demand a set of sensitive actions that are reachable from the piece of code protected by the Demand.

Another rule that can be applied is that every permission Assert should be necessary and should have a minimal scope, thereby complying with the general "least privilege principle" of system security. For each "Assert $P_a$" followed by a piece of code, the analysis module checks to determine whether the permission Assert is necessary and has minimal scope by:

(1) Verifying that the Assert may be necessary at runtime, therefore justifying its runtime cost. Such a check may be achieved by identifying a node for the method implementation associated with the Assert and having dynamic permissions D that do not necessarily include $P_a$. Otherwise, the Assert can be flagged as redundant in the test configuration, which may warrant removing the Assert from the trusted component code.

(2) (a) Recursively computing the nodes that are (i) reachable from that privileged piece of code and (ii) only reached at nodes with dynamic permissions D that may include $P_a$ and (b) collecting all reachable permission Demands in these nodes with permissions $P_d$ included in $P_a$, irrespective of the caller. These method implementations can be used to document the security need for coding the Assert. In case there are no such Demands, the Assert can be flagged as unnecessary. In case there exists a permission $P'_a$ weaker than $P_a$ that contains all demanded permissions $P_d$, the asserted permission $P_a$ can be flagged as unnecessarily high. In case parts of the code protected by the Assert do not reach any associated Demand, the scope of the Assert can be flagged as unnecessarily large in the test configuration. (The asserted permission $P_a$ is also referred to as a parameter permission of the Assert.) In one implementation, the use of matching "RevertAssert" security actions can be used to cancel the effect of the Assert immediately after the last call to a method that reached an associated Demand.

In combination, the two types of queries described above can be used to suggest moving Asserts and Demands within the trusted component code in order to minimize their runtime cost while providing an adequate level of protection. In addition, for every public method that can reach a Demand that may fail for a given permission, the annotations associated with that node may be checked to verify that the Demand in the method with that particular permission may succeed.

As an example, a piece of code may Demand a permission before calling a "protected" method, whereas the same method can be called directly by a class in unknown code that inherits from the implementation class. A query can detect and report this situation, with two likely explanations: (1) the Demand is useless; or (2) the implementation class should be "sealed".

Yet another rule that can be applied is that security check should be uniform: for a given protected sensitive action, and for every control path to the sensitive action, the series of security actions should implement the same (implicit) security specification. More generally, permission classes define a data structure, rather than a security policy, and the information collected by the analysis should provide a synthetic view of the usage of these permission classes to protect sensitive operations.

Therefore, using the graph for a given set of sensitive actions, the nodes of the graph may be partitioned into "ordinary nodes" and a "protected subsystem". Furthermore, every edge can be checked to ensure that each edge from an ordinary node to the protected subsystem corresponds to a piece of code that implements adequate security checks for these sensitive actions. Once identified, the protective "boundary" and the contents of the protected subsystem provide a clear summary of access control for these sensitive actions. Using the call graph, the partitioning can be largely automated, for example, by defining the "protected subsystem" as the set of nodes with dynamic permissions D containing the particular permission intended to protect these sensitive actions or defining the protective boundary of the protected subsystem as the set of nodes that meet a path query on the graph.

Yet another rule that may be applied involves a comparison between the results of identical queries on different call graphs, generated from different input configurations. This approach is particularly useful when comparing similar configurations, such as comparing a "reference" configuration that has been extensively analyzed and tested to an "updated" version of that configuration.

For example, a developer or tester may check and carefully review any new paths leading to sensitive operations in the call graph for the "updated" configuration, under the assumptions that all previously-existing paths have already been reviewed. Typical applications of this comparative analysis involve an updated configuration with:

A change in the static permissions attributed to some components

The addition of a new trusted component to a much-larger collection of components, including standard libraries.

The update of a few method implementations in a component, for example, to fix a security error or to extend their functionality.

Yet another rule that can be applied involves the checking of link-demand usage. For performance reasons, declarative "link-demands" may be used in place of Demands, with the same security intent. It can be verified that link-demands and Demands have the same impact on control flow. Furthermore, Demands that can be safely replaced with link-demands or discarded can be identified. If, for every node of the call graph associated with a method implementation, the dynamic permissions D contain the demanded permission P, then the operations link-demand P and Demand P are equivalent. Otherwise, any path from unknown code to the node with dynamic permissions that lack P can pass the link-demand but would cause a Demand to fail. Such paths may be flagged for manual review. In addition, a call graph can be used to visit all (potential) dynamic callers of a particular method with a dynamic Demand. This usage of the call graph facilitates manual consideration of whether replacing the Demand with a link-demand to a permission specific to these callers is warranted.

Queries on the call graph can also be used to determine whether a code transformation is correct in a given test configuration. The responses to the queries may be passed to some other part of the system, such as an optimizing compiler, either at runtime or by annotating the code in advance. For example:

A method call may be inlined by replacing the call to that method by the code that implements the method. This transformation is correct if the dynamic permissions for the inlined code are not affected. In most cases, a series of simple checks on the code and its corresponding nodes in the call graph suffice to ensure that the transformation is correct.

Similarly, the correctness of a tail call elimination can be statically guaranteed by simple checks on the code and the call graph.

More specifically, queries detailed above may be run on the call graph to determine whether the relocation of security actions, such as Assert and Demand, or even their elimination, is correct for a given configuration. For example, if a Demand always' succeeds, it can safely be eliminated from the code as it is loaded into the system.

A permission-sensitive call graph can also be used to explore the consequences of changing the static permissions attached to known components, which can be controlled using "Declarative Requests" attached to these components. For example, before removing a particular permission P from the static permissions of a given component, a list may be generated of all nodes with code from that component that is reachable with dynamic permissions that may contain P. From this list, a report of all Demands that are reachable from these nodes and that may fail as a result of the change (i.e., the removal of the permission P) may be computed. Conversely, the call graph may be used to identify such permissions P for a given configuration. In the special case of a closed program (i.e., one with no unknown components), a call graph may be used to determine which Demands in the closed program may fail at runtime.

The permission-sensitive call graph can also be used to check several specific properties on permissions. Various optimizations may be apparent using the call graph and some additional local checks for each reachable security action:

Some arguments of permissions, such as file name expressions for System.FileIOPermissions, must be appropriately normalized.

For efficiency reasons, frequently used permission objects should be allocated once and for all. Similarly, security actions should preferably be moved outside execution loops.

Security actions, such as Asserts and Demands, can be programmed using either dynamic method calls or declarative security attributes. The trade-off between the two choices is expressiveness versus performance. The call graph provides useful information for deciding which choice is best.

The permission-sensitive call graph can also be used to evaluate security risks introduced by changes to the security infrastructure. For example, if new trusted libraries are made accessible to untrusted code or if the security model is changed, the call graph may be used to determine whether any new security vulnerabilities are introduced by the changes.

Figure 4:
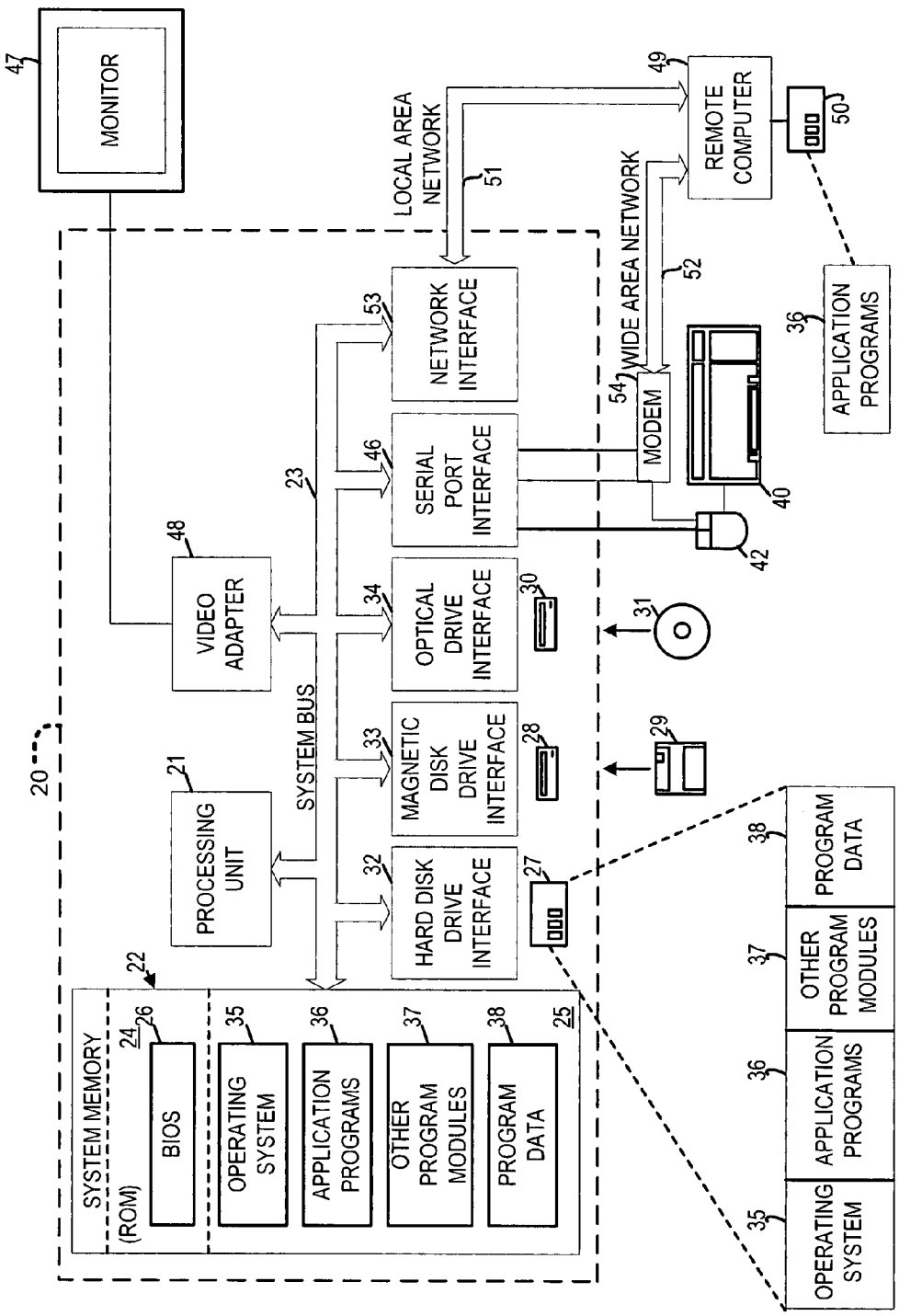
FIG. 4 illustrates a system useful for implementing an embodiment of the present invention.

The exemplary hardware and operating environment of FIG. 4 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a call graph generator, a call graph analyzer, a security framework, and other modules may be incorporated as part of the operating system 35, application programs 36, or other program modules 37. A call graph, a call path set, an input permission set, one or more queries, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
receiving into an execution environment input component code and a runtime security policy, wherein the runtime security policy comprises an assignment of rights to the input component code and security checks performed as the input component code is loaded; and
generating a call graph of call paths through the input component code simulated in combination with at least one symbolic component representing additional arbitrary code that complies with the runtime security policy, wherein the generating operation comprises:
generating a class hierarchy that contains classes of the input component code and symbolic classes that represent classes of the arbitrary code;
generating at least one constraint associated with a virtual call in the input component code;
evaluating the at least one constraint by a symbolic computation on potential target classes for the virtual call in the generated class hierarchy;
generating at least one constraint associated with either a security demand or a security assert in the input component code;
evaluating the at least one constraint by a symbolic computation on dynamic permissions of the input component code and on a parameter permission of the security demand or the security assert; and
conditionally generating at least one additional constraint associated with one or more instructions located in the input component code after the security demand or assert, responsive to the evaluating operation.

2. The method of claim 1 wherein a possible execution path through the input component code that is compliant with the runtime security policy is represented by an individual call path.

3. The method of claim 1 wherein at least one node in the call graph includes a symbolic permission set and a known method implementation.

4. The method of claim 1 wherein at least one node in the call graph includes a symbolic permission set and a token representing an unknown method implementation.

5. The method of claim 1 wherein the generating operation comprises:
initializing a symbolic value that represents data values that may be obtained by the arbitrary code at runtime.

6. The method of claim 1 wherein the generating operation comprises:
updating a symbolic value that represents data values that may be obtained by the arbitrary code at runtime based on detection of an additional data value that may be passed as a parameter to the arbitrary code at runtime.

7. The method of claim 1 wherein the generating operation comprises:
updating a symbolic value that represents data values that may be obtained by the arbitrary code at runtime based on detection of a new dataflow to the arbitrary code.

8. The method of claim 1 wherein the generating operation comprises:
generating a class hierarchy that contains classes of the input component code and symbolic classes that represent classes of arbitrary code.

9. The method of claim 1 wherein the generating operation comprises:
identifying one or more methods of the input code component that can be called by the arbitrary code.

10. The method of claim 1 wherein the generating operation comprises:
identifying one or more methods of the input component code that can be called by the arbitrary code; and
identifying one or more other methods of the input component code that can be called by the identified one or more methods of the input component code.

11. The method of claim 1 wherein the generating operation comprises:
identifying one or more methods of the input component code that can be called by the arbitrary code; and
identifying at least one method of the arbitrary code that can be called by a virtual call of the identified one or more methods of the input component code.

12. The method of claim 1 wherein any method reachable by execution in accordance with the runtime security policy is represented by one of more nodes in the call graph.

13. The method of claim 1 wherein the generating operation comprises:
generating at least one constraint associated with one or more instructions in the input component code.

14. The method of claim 1 wherein the generating operation comprises:
generating at least one constraint associated with a parameter of a method call in the input component code.

15. The method of claim 1 wherein the generating operation comprises:
generating at least one constraint associated with a returned result of a method call in the input component code.

16. The method of claim 1 further comprising:
analyzing the call graph to identify a call path that presents a security vulnerability in the input component code.

17. The method of claim 1 further comprising:
analyzing the call graph to identify a call path that presents a security vulnerability in the input component code and a call path that presents no security vulnerability in the input component code.

18. The method of claim 1 further comprising:
analyzing the call graph to generate a security report that identifies a security vulnerability in the input component code.

19. The method of claim 1 further comprising:
analyzing the call graph to identify a call path that satisfies a query.

20. The method of claim 1 further comprising:
analyzing the call graph to identify a security-vulnerable usage of a permission demand.

21. The method of claim 1 further comprising:
analyzing the call graph to identify a security-vulnerable usage of a permission assertion.

22. The method of claim 1 further comprising:
analyzing the call graph to identify a lack of uniform usage of security checks.

23. The method of claim 1 further comprising:
analyzing the call graph to identify an equivalence between use of a permission link-demand and a permission demand.

24. The method of claim 1, further comprising
analyzing the call graph to classify, based on permissions, pieces of code performing sensitive actions in the input component code.

25. The method of claim 1, further comprising
analyzing the call graph and another call graph obtained for a different version of input component code to generate a security report that identifies a security vulnerability in the different version of the input component code.

26. The method of claim 1, further comprising
analyzing the call graph and another call graph obtained for a different version of input component code to identify a call path that presents a security vulnerability in the different version of the input component code.

27. A computer program storage medium encoding a computer program for executing on a computer system a computer process, the computer process comprising:
receiving into an execution environment input component code and a runtime security policy, wherein the runtime security policy comprises an assignment of rights to the input component code and security checks performed as the input component code is loaded; and
generating a call graph of call paths through the input component code simulated in combination with at least one symbolic component representing additional arbitrary code that complies with the runtime security policy, wherein the generating operation comprises:
generating a class hierarchy that contains classes of the input component code and symbolic classes that represent classes of the arbitrary code;
generating at least one constraint associated with a virtual call in the input component code;
evaluating the at least one constraint by a symbolic computation on potential target classes for the virtual call in the generated class hierarchy;
generating at least one constraint associated with either a security demand or a security assert in the input component code;
evaluating the at least one constraint by a symbolic computation on dynamic permissions of the input component code and on a parameter permission of the security demand or the security assert; and
conditionally generating at least one additional constraint associated with one or more instructions located in the input component code after the security demand or assert, responsive to the evaluating operation.

28. The computer program storage medium of claim 27 wherein a possible execution path through the input component code that is compliant with the runtime security policy is represented by an individual call path.

29. The computer program storage medium of claim 27 wherein at least one node in the call graph includes a symbolic permission set and a known method implementation.

30. The computer program storage medium of claim 27 wherein at least one node in the call graph includes a symbolic permission set and a token representing an unknown method implementation.

31. The computer program storage medium of claim 27 wherein the generating operation comprises:
initializing a symbolic value that represents data values that may be obtained by the arbitrary code at runtime.

32. The computer program storage medium of claim 27 wherein the generating operation comprises:
updating a symbolic value that represents data values that may be obtained by the arbitrary code at runtime based on detection of an additional data value that may be passed as a parameter to the arbitrary code at runtime.

33. The computer program storage medium of claim 27 wherein the generating operation comprises:
updating a symbolic value that represents data values that may be obtained by the arbitrary code at runtime based on detection of a new dataflow to the arbitrary code.

34. The computer program storage medium of claim 27 wherein the generating operation comprises:
generating a class hierarchy that contains classes of the input component code and symbolic classes that represent classes of arbitrary code.

35. The computer program storage medium of claim 27 wherein the generating operation comprises:
identifying one or more methods of the input component code that can be called by the arbitrary code.

36. The computer program storage medium of claim 27 wherein the generating operation comprises:
identifying one or more methods of the input component code that can be called by the arbitrary code; and
identifying one or more other methods of the input component code that can be called by the identified one or more methods of the input component code.

37. The computer program storage medium of claim 27 wherein the generating operation comprises:
identifying one or more methods of the input component code that can be called by the arbitrary code; and
identifying at least one method of the arbitrary code that can be called by a virtual call of the identified one or more methods of the input component code.

38. The computer program storage medium of claim 27 wherein any method reachable by execution in accordance with the runtime security policy is represented by one of more nodes in the call graph.

39. The computer program storage medium of claim 27 wherein the generating operation comprises:
generating at least one constraint associated with one or more instructions in the input component code.

40. The computer program storage medium of claim 27 wherein the generating operation comprises:
generating at least one constraint associated with a parameter of a method call in the input component code.

41. The computer program storage medium of claim 27 wherein the generating operation comprises:
generating at least one constraint associated with a returned result of a method call in the input component code.

42. The computer program storage medium of claim 27 wherein the computer process further comprises:
analyzing the call graph to identify a call path that presents a security vulnerability in the input component code.

43. The computer program storage medium of claim 27 wherein the computer process further comprises:
analyzing the call graph to identify a call path that presents a security vulnerability in the input component code and a call path that presents no security vulnerability in the input component code.

44. The computer program storage medium of claim 27 wherein the computer process further comprises:
analyzing the call graph to generate a security report that identifies a security vulnerability in the input component code.

45. The computer program storage medium of claim 27 wherein the computer process further comprises:
analyzing the call graph to identify a call path that satisfies a query.

46. The computer program storage medium of claim 27 wherein the computer process further comprises:
analyzing the call graph to identify a security-vulnerable usage of a permission demand.

47. The computer program storage medium of claim 27 wherein the computer process further comprises:
analyzing the call graph to identify a security-vulnerable usage of a permission assertion.

48. The computer program storage medium of claim 27 wherein the computer process further comprises:

analyzing the call graph to identify a lack of uniform usage of security checks.

49. The computer program storage medium of claim 27 wherein the computer process further comprises:
analyzing the call graph to identify an equivalence between use of a permission link-demand and a permission demand.

50. The computer program storage medium of claim 27 further comprising
analyzing the call graph to classify, based on permissions, pieces of code performing sensitive actions in the input component code.

51. The computer program storage medium of claim 27 further comprising
analyzing the call graph and another call graph obtained for a different version of input component code to generate a security report that identifies a security vulnerability in the different version of the input component code.

52. The computer program storage medium of claim 27 further comprising
analyzing the call graph and another call graph obtained for a different version of input component code to identify a call path that presents a security vulnerability in the different version of the input component code.

53. A system comprising:
a processor comprising a processing unit;
a call graph generator executing on the processing unit that receives into an execution environment input component code and a runtime security policy and generates a call graph of call paths through the input component code simulated in combination with at least one symbolic component that represents additional arbitrary code that complies with the runtime security policy, wherein the runtime security policy comprises an assignment of rights to the input component code and security checks performed as the input component code is loaded, wherein the call graph generator further:
generates a class hierarchy that contains classes of the input component code and symbolic classes that represent classes of the arbitrary code;
generates at least one constraint associated with a virtual call in the input component code;
evaluates the at least one constraint by a symbolic computation on potential target classes for the virtual call in the generated class hierarchy;
generates at least one constraint associated with either a security demand or a security assert in the input component code;
evaluates the at least one constraint by a symbolic computation on dynamic permissions of the input component code and on a parameter permission of the security demand or the security assert; and
conditionally generates at least one additional constraint associated with one or more instructions located in the input component code after the security demand or assert, responsive to the evaluating operation.

54. The system of claim 53 wherein a possible execution path through the input component code that is compliant with the runtime security policy is represented by an individual call path.

55. The system of claim 53 further comprising:
a call graph analyzer executing on the processing unit that analyzes the call graph to identify a security-vulnerable usage of a permission demand.

56. The system of claim 53 further comprising:
a call graph analyzer executing on the processing unit that analyzes the call graph to identify a security-vulnerable usage of a permission assertion.

57. The system of claim 53 further comprising:
a call graph analyzer executing on the processing unit that analyzes the call graph to identify a lack of uniform usage of security checks.

58. The system of claim 53 further comprising:
a call graph analyzer executing on the processing unit that analyzes the call graph to identify an equivalence between use of a permission link-demand and a permission demand.

59. A method comprising:
analyzing relative to at least one query a call graph of call paths through input component code simulated in combination with at least one symbolic component representing additional arbitrary code that complies with a runtime security policy, wherein the runtime security policy comprises an assignment of rights to the input component code and security checks performed as the input component code is loaded, wherein the analyzing operation comprises:
generating a class hierarchy that contains classes of the input component code and symbolic classes that represent classes of the arbitrary code;
generating at least one constraint associated with a virtual call in the input component code;
evaluating the at least one constraint by a symbolic computation on potential target classes for the virtual call in the generated class hierarchy;
generating at least one constraint associated with either a security demand or a security assert in the input component code;
evaluating the at least one constraint by a symbolic computation on dynamic permissions of the input component code and on a parameter permission of the security demand or the security assert; and
identifying a subset of the call paths in the call graph that satisfy the query.

60. The method of claim 59 wherein the analyzing operation comprises:
analyzing the call graph to identify a security-vulnerable usage of a permission demand.

61. The method of claim 59 wherein the analyzing operation comprises:
analyzing the call graph to identify a security-vulnerable usage of a permission assertion.

62. The method of claim 59 wherein the analyzing operation comprises:
analyzing the call graph to identify a lack of uniform usage of security checks.

63. The method of claim 59 wherein the analyzing operation comprises:
analyzing the call graph to identify an equivalence between use of a permission link-demand and a permission demand.

64. A computer program storage medium encoding a computer program for executing on a computer system a computer process, the computer process comprising:
analyzing relative to at least one query a call graph of call paths through input component code simulated in combination with at least one symbolic component representing additional arbitrary code that complies with a runtime security policy, wherein the runtime security policy comprises an assignment of rights to the input component code and security checks performed as the input component code is loaded, wherein the analyzing operation comprises:

generating a class hierarchy that contains classes of the input component code and symbolic classes that represent classes of the arbitrary code;

generating at least one constraint associated with a virtual call in the input component code;

evaluating the at least one constraint by a symbolic computation on potential target classes for the virtual call in the generated class hierarchy;

generating at least one constraint associated with either a security demand or a security assert in the input component code;

evaluating the at least one constraint by a symbolic computation on dynamic permissions of the input component code and on a parameter permission of the security demand or the security assert;

conditionally generating at least one additional constraint associated with one or more instructions located in the input component code after the security demand or assert, responsive to the evaluating operation; and identifying a subset of the call paths in the call graph that satisfy the query.

65. The computer program storage medium of claim 64 wherein the computer process further comprises:

analyzing the call graph to identify a security-vulnerable usage of a permission demand.

66. The computer program storage medium of claim 64 wherein the computer process further comprises:

analyzing the call graph to identify a security-vulnerable usage of a permission assertion.

67. The computer program storage medium of claim 64 wherein the computer process further comprises:

analyzing the call graph to identify a lack of uniform usage of security checks.

68. The computer program storage medium of claim 64 wherein the computer process further comprises:

analyzing the call graph to identify an equivalence between use of a permission link-demand and a permission demand.

69. A system comprising:

a processing unit and a memory;

a call graph analyzer executing on the processing unit, the call graph analyzer analyzing relative to at least one query a call graph of call paths through input component code simulated in combination with at least one symbolic component representing additional arbitrary code that complies with a runtime security policy, wherein the runtime security policy comprises an assignment of rights to the input component code and security checks performed as the input component code is loaded, wherein the call graph analyzer further:

generates a class hierarchy that contains classes of the input component code and symbolic classes that represent classes of the arbitrary code;

generates at least one constraint associated with a virtual call in the input component code;

evaluates the at least one constraint by a symbolic computation on potential target classes for the virtual call in the generated class hierarchy;

generates at least one constraint associated with either a security demand or a security assert in the input component code;

evaluates the at least one constraint by a symbolic computation on dynamic permissions of the input component code and on a parameter permission of the security demand or the security assert;

conditionally generates at least one additional constraint associated with one or more instructions located in the input component code after the security demand or assert, responsive to the evaluating operation, and identifying a subset of the call paths in the call graph that satisfy the query.

70. The system of claim 69 wherein the call graph analyzer analyzes the call graph to identify a security-vulnerable usage of a permission demand.

71. The system of claim 69 wherein the call graph analyzer analyzes the call graph to identify a security-vulnerable usage of a permission assertion.

72. The system of claim 69 wherein the call graph analyzer analyzes the call graph to identify a lack of uniform usage of security checks.

73. The system of claim 69 wherein the call graph analyzer analyzes the call graph to identify an equivalence between use of a permission link-demand and a permission demand.

* * * * *

UNITED STATES PATENT AND TRADEMARK OFFICE
CERTIFICATE OF CORRECTION

| | | |
|---|---|---|
| PATENT NO. | : 7,437,718 B2 | Page 1 of 1 |
| APPLICATION NO. | : 10/656654 | |
| DATED | : October 14, 2008 | |
| INVENTOR(S) | : Fournet et al. | |

It is certified that error appears in the above-identified patent and that said Letters Patent is hereby corrected as shown below:

In column 8, line 27, delete "maybe" and insert -- may be --, therefor.

Signed and Sealed this
Third Day of May, 2011

David J. Kappos
*Director of the United States Patent and Trademark Office*